(12) United States Patent
Mochizuki et al.

(10) Patent No.: US 8,968,691 B2
(45) Date of Patent: Mar. 3, 2015

(54) TREATMENT METHOD AND TREATMENT FACILITIES OF EXHAUST GAS

(75) Inventors: Yoshihiko Mochizuki, Tokyo (JP); Naoyuki Ohashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 215 days.

(21) Appl. No.: 13/195,900

(22) Filed: Aug. 2, 2011

(65) Prior Publication Data

US 2012/0034145 A1  Feb. 9, 2012

(30) Foreign Application Priority Data

Aug. 3, 2010 (JP) ................................. 2010-174669

(51) Int. Cl.
   *B01D 53/52* (2006.01)
   *B01D 53/50* (2006.01)

(52) U.S. Cl.
   CPC ...... *B01D 53/502* (2013.01); *B01D 2251/2062* (2013.01); *B01D 2251/404* (2013.01)
   USPC .............. 423/242.1; 423/243.06; 423/243.01; 422/168

(58) Field of Classification Search
   None
   See application file for complete search history.

(56) References Cited

U.S. PATENT DOCUMENTS

| | | | |
|---|---|---|---|
| 4,029,752 A * | 6/1977 | Cahn ............................. | 423/563 |
| 4,156,712 A | 5/1979 | Kanai et al. | |
| 4,696,805 A | 9/1987 | Shinoda et al. | |
| 5,510,094 A * | 4/1996 | Bhat et al. ................ | 423/243.07 |
| 5,618,511 A * | 4/1997 | Randolph et al. ............. | 423/545 |
| 6,221,325 B1 * | 4/2001 | Brown et al. ............ | 423/243.06 |
| 7,022,296 B1 * | 4/2006 | Khang et al. .................. | 423/210 |
| 8,088,348 B2 * | 1/2012 | Ukai et al. ..................... | 423/210 |
| 2002/0155038 A1 | 10/2002 | Ohi et al. | |
| 2008/0038173 A1* | 2/2008 | Bradburn et al. .......... | 423/215.5 |

FOREIGN PATENT DOCUMENTS

| | | |
|---|---|---|
| CA | 2712074 A1 | 7/2009 |
| CN | 1035060 A | 8/1989 |

(Continued)

OTHER PUBLICATIONS

Japanese Office Action, Received Jun. 14, 2013.

(Continued)

*Primary Examiner* — Melvin C Mayes
*Assistant Examiner* — Sheng H Davis
(74) *Attorney, Agent, or Firm* — Antonelli, Terry, Stout & Kraus, LLP.

(57) ABSTRACT

An object of the present invention is to provide a treatment method and a plant of an exhaust gas in which corrosion resistance of the exhaust gas treatment plant to a sulfuric acid mist after wet type desulfurization is increased. The treatment method of an exhaust gas in the present invention, wherein sulfur oxide is removed by wet type desulfurization of the exhaust gas and a sulfuric acid mist is removed by feeding ammonia into the exhaust gas, is characterized in that an ammonia gas is mixed into the exhaust gas by feeding inorganic ammonium salt to an alkali desulfurizing agent when the desulfurizing agent is sprayed into the exhaust gas to absorb and remove the sulfur oxide in the exhaust gas.

8 Claims, 2 Drawing Sheets

(56) References Cited

FOREIGN PATENT DOCUMENTS

| | | | |
|---|---|---|---|
| CN | 1114593 | A | 1/1996 |
| CN | 1131718 | C | 12/2003 |
| DE | 3005517 | * | 8/1981 |
| JP | S49-064954 | A | 8/1974 |
| JP | S50-024264 | B | 8/1975 |
| JP | h07-155537 | A | 6/1995 |
| JP | H08-000951 | A | 1/1996 |
| JP | 2007-260619 | | 10/2007 |
| WO | 2007110983 | * | 4/2007 |

OTHER PUBLICATIONS

Chinese Office Action issued on Jul. 22, 2013, in connection with application No. 2011102059985.

First Examination Report from the Saudi Patent Office dated Jun. 3, 2014.

Chinese Office Action issued on Mar. 25, 2014, in connection with application No. 2011102059985.

* cited by examiner

TREATMENT METHOD AND TREATMENT FACILITIES OF EXHAUST GAS

BACKGROUND (a) Field of the Invention

The present invention relates to an exhaust gas treatment method and treatment facilities that remove a sulfuric acid mist in an exhaust gas by a wet type electrostatic precipitator.

(b) Description of the Related Arts

Exhaust gases given off from boilers, combustion furnaces and the like using petroleum, heavy oil and the like as fuel contain sulfur oxides such as sulfur dioxide and sulfur trioxide. Particularly, a heavy oil exhaust gas containing sulfur components in high concentrations has high content of $SO_3$ in the exhaust gas.

In a conventional exhaust gas treatment plant, a dry type electrostatic precipitator and a wet type flue gas desulfurization equipment are disposed in this order subsequent to a boiler. An exhaust gas discharged from the boiler is dusted by the dry type electrostatic precipitator before being introduced into the wet type flue gas desulfurization equipment. In the wet type flue gas desulfurization equipment, a Ca base or Na base agent is used as an alkali agent to remove sulfur oxide in the exhaust gas. $SO_3$ of sulfur oxides has a small particle size and is in a mist state. Thus, $SO_3$ cannot be adequately removed by the wet type flue gas desulfurization equipment and therefore, a wet type electrostatic precipitator is separately provided subsequent to the wet type flue gas desulfurization equipment to remove $SO_3$.

An exhaust gas treatment plant according to Japanese Patent Application Laid-Open No. 2007-260619 determines the amount of sulfuric acid mist after wet type desulfurization and mixes an ammonia gas whose equivalent weight ratio to the determined sulfuric acid mist is 1 or less between the wet type flue gas desulfurization equipment and the wet type electrostatic precipitator to remove the sulfuric acid mist by the wet type electrostatic precipitator.

However, a mist introduced into the wet type electrostatic precipitator has $SO_3$ as a main component and pH thereof is smaller than 2 and thus, the inside of the wet type electrostatic precipitator is subject to violent corrosion. Thus, measures to slow down the corrosion speed by spraying spray water whose pH is adjusted into the wet type electrostatic precipitator continuously or the like are taken. Also, a heat sinking unit of a gas-gas heater subsequent to the electrostatic precipitator has a problem of shortened life of material due to a sulfuric acid mist sticking to the surface of a pipe group and concentrated by an evaporation process.

As shown in Japanese Patent Application Laid-Open No. 2007-260619, equipment such as a compressed gas cylinder of ammonia and a pressure control valve is needed to feed an ammonia gas to allow a reaction with a sulfuric acid mist into the plant and such equipment has a problem of complicated handling.

To solve the problems of the above conventional technology, an object of a treatment method and a treatment plant of an exhaust gas according to the present invention is to provide a treatment method and a plant of an exhaust gas in which corrosion resistance of the exhaust gas treatment plant to a sulfuric acid mist after wet type desulfurization is increased. Also, an object of a treatment method and a plant of an exhaust gas according to the present invention is to make the feeding of ammonia allowed to react with a sulfuric acid mist easier.

SUMMARY

A treatment method of an exhaust gas in the present invention, wherein sulfur oxide is removed by wet type desulfurization of the exhaust gas using an alkali desulfurizing agent and a sulfuric acid mist is removed by feeding ammonia into the exhaust gas, is characterized in that an ammonia gas is mixed into the exhaust gas by feeding inorganic ammonium salt to an alkali desulfurizing agent when the desulfurizing agent is sprayed into the exhaust gas to absorb and remove the sulfur oxide in the exhaust gas. With the above configuration, an ammonia gas can be generated by feeding inorganic ammonium salt to allow the inorganic ammonium salt to react with an alkali desulfurizing agent in the wet type desulfurization step using the desulfurizing agent. By generating an ammonia gas in the flue gas desulfurization equipment, the ammonia gas and a sulfuric acid mist are allowed to stay longer to react sufficiently up to the wet type electrostatic precipitator subsequent thereto.

DETAILED DESCRIPTION OF EMBODIMENTS

A treatment method and a plant of an exhaust gas according to the present invention will be described in detail below with reference to appended drawings.

Figure 1:
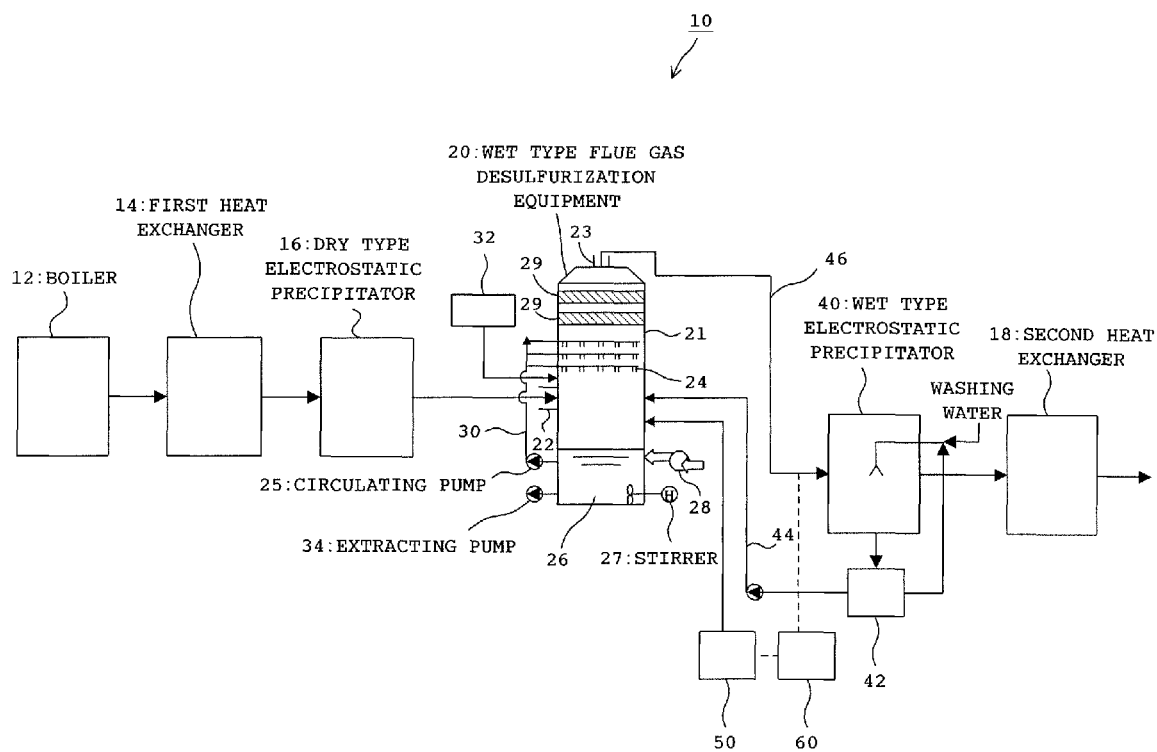
FIG. 1 is a diagram showing a schematic configuration of an exhaust gas treatment plant according to the present embodiment.

FIG. 1 is a diagram showing a schematic configuration of an exhaust gas treatment plant according to the present embodiment. As shown in FIG. 1, an exhaust gas treatment plant 10 according to the present invention includes a boiler 12, a first heat exchanger 14, a dry type electrostatic precipitator 16, wet type flue gas desulfurization equipment 20, a wet type electrostatic precipitator 40, and a second heat exchanger 18 as basic elements and elements from the boiler 12 to a chimney (not shown) are disposed in this order.

An exhaust gas discharged from the boiler 12 is introduced into the first heat exchanger 14. A gas-gas heater can be used as an example of the first heat exchanger 14. In the first heat exchanger 14, the air such as the air for combustion is preheated using heat of the exhaust gas. More specifically, the first heat exchanger 14 lowers the temperature of the exhaust gas to one hundred and several tens degrees by a heat exchange (absorption of heat) with the air such as the air for combustion.

Next, the heat-exchanged exhaust gas is introduced into the dry type electrostatic precipitator 16 to remove dust contained in the exhaust gas.

The wet type flue gas desulfurization equipment 20 includes, as an example, a desulfurization tower main body 21, an inlet duct 22, an outlet duct 23, a spray nozzle 24, a circulating pump 25 of an absorbing solution, an oxidation chamber 26, a stirrer 27, an air suction pipe 28, and an eliminator 29 as main basic elements. The inlet duct 22 of an exhaust gas is formed on the side face of the desulfurization tower main body 21 and the outlet duct 23 is formed on the top face thereof. The spray nozzles 24 of an absorbing solution are formed between the inlet duct 22 and the outlet duct 23 in the horizontal direction in a plurality of stages. The oxidation chamber 26 where an absorbing solution is stored is formed in a lower part of the desulfurization tower main body 21 and a circulating liquid pipe 30 including the stirrer 27, the air suction pipe 28, and the circulating pump 25 and a desulfurizing agent feeding unit 32 are disposed. Also, the eliminator 29 is formed on the main body side of the outlet duct 23. In the wet type flue gas desulfurization equipment 20 configured as described above, an exhaust gas is introduced into the desulfurization tower main body 21 through the inlet duct 22. In the desulfurization tower main body 21, an absorbing solution fed from the circulating pump 25 and containing a desulfurizing agent is sprayed from the spray nozzles 24 so that gas-liquid contact between the absorbing solution and exhaust gas occurs.

If, for example, calcium carbonate ($CaCO_3$) is used as the desulfurizing agent, the absorbing solution selectively absorbs $SO_2$ in the exhaust gas to generate calcium bisulfite. The desulfurizing agent in a slurry state is fed into the oxidation chamber 26 by the desulfurizing agent feeding unit 32. The absorbing solution that has generated calcium bisulfite remains in the oxidation chamber 26 and is oxidized by the air fed from the air suction pipe 28 to generate gypsum ($CaSO_4$) while being stirred by the stirrer 27. A portion of the absorbing solution in the oxidation chamber 26 in which calcium carbonate and gypsum coexist is fed to the spray nozzles 24 again from the circulating liquid pipe 30. The other portion thereof is discharged to the outside from an extracting pump 34 of the absorbing solution for liquid-waste treatment. The wet type desulfurized exhaust gas is discharged from the outlet duct 23 to the wet type electrostatic precipitator 40 subsequent thereto. At this point, small droplets sprayed from the spray nozzles 24 are recovered by the eliminator 29.

In the wet type electrostatic precipitator 40, a desulfurization mist and dust are removed. The exhaust gas discharged from the wet type electrostatic precipitator 40 is introduced into the second heat exchanger 18. A gas-gas heater can be used as an example of the second heat exchanger 18. In the second heat exchanger 18, white smoke is prevented when the exhaust gas is reheated and discharged from the chimney. After being reheated by the second heat exchanger 18, the treated exhaust gas is discharged to the outside from the chimney (not shown).

The wet type electrostatic precipitator 40 also cleans dust and ammonium sulfate sticking to a dust-collecting plate with washing water. A recovery unit 42 of the washing water is provided in the wet type electrostatic precipitator 40. The recovery unit 42 is configured so that, after ammonium sulfate generated by a reaction of an ammonia gas and a sulfuric acid mist and the washing water being separated, the washing water separated from ammonium sulfate is reused as the washing water.

In such a basic configuration, the exhaust gas treatment plant 10 according to the present invention that removes sulfur oxides by wet type desulfurization of an exhaust gas and removes a sulfuric acid mist by feeding ammonia into the exhaust gas includes in the wet type flue gas desulfurization equipment 20 that absorbs and removes sulfur oxide in the exhaust gas by spraying an alkali desulfurizing agent into the exhaust gas a feeding unit 50 of inorganic ammonium salt that generates an ammonia gas by being allowed to react with a desulfurizing agent inside the wet type flue gas desulfurization equipment 20.

Also, the exhaust gas treatment plant 10 according to the present embodiment that removes sulfur oxides by wet type desulfurization of an exhaust gas and removes a sulfuric acid mist by feeding ammonia into the exhaust gas includes the wet type flue gas desulfurization equipment 20 that absorbs and removes sulfur oxides in the exhaust gas by spraying an alkali desulfurizing agent into the exhaust gas, the wet type electrostatic precipitator 40 that removes a sulfuric acid mist allowed to react with ammonia, a pH measuring unit 60 that measures a pH value of the sulfuric acid mist at the inlet of the wet type electrostatic precipitator 40, and the feeding unit 50 of inorganic ammonium salt that generates an ammonia gas by being allowed to react with a desulfurizing agent inside the wet type flue gas desulfurization equipment 20 based on the pH value.

Further, the exhaust gas treatment plant 10 according to the present embodiment includes the recovery unit 42 capable of feeding a collected liquid containing inorganic ammonium salt discharged from the wet type electrostatic precipitator 40 to the wet type flue gas desulfurization equipment 20.

The feeding unit 50 of inorganic ammonium salt according to the present embodiment is connected to the wet type flue gas desulfurization equipment 20 to be able to feed inorganic ammonium salt in a liquid or solid state into the oxidation chamber 26 of the equipment.

As inorganic ammonium salt according to the present embodiment, for example, one of $NH_4Cl$, $NH_4NO_3$, $(NH_4)_2CO_3$, and $(NH_4)_2SO_4$ or a combination thereof can be used. According to such inorganic ammonium salt, compared with an ammonia gas fed from a compressed-gas cylinder, the inorganic ammonium salt is easy to handle because the inorganic ammonium salt is a neutral compound. That is, like the desulfurizing agent feeding unit 32, the inorganic ammonium salt in a liquid or solid state may be fed from the feeding unit 50 to the oxidation chamber 26. By allowing the inorganic ammonium salt to react with an alkali desulfurizing agent, an ammonia gas can easily be mixed into an exhaust gas containing a sulfuric acid mist.

An alkali desulfurizing agent in the present embodiment may be any alkali desulfurizing agent that gives off an ammonia gas in a reaction with inorganic ammonium salt and, as an example, caustic soda (NaOH), lime ($CaCO_3$), or $Mg(OH)_2$ may be used.

If $CaCO_3$ is used as a desulfurizing agent, as described above, calcium carbonate and gypsum coexist inside the oxidation chamber 26. If inorganic ammonium salt (if, for example, ammonium sulfate: $(NH_4)_2SO_4$ is used) in a liquid or solid state is fed into the oxidation chamber 26, an ammonia gas is given off by the following reaction formulas of an alkali desulfurizing agent and inorganic ammonium salt:

$$(NH_4)_2SO_4 + CaCO_3 \rightarrow (NH_4)_2CO_3 + CaSO_4 \quad (1)$$

$$(NH_4)_2CO_3 \rightarrow 2NH_3 + CO_2 + H_2O \quad (2)$$

Inside the wet type flue gas desulfurization equipment 20, the desulfurizing agent is sprayed into the exhaust gas and sulfur dioxide in the exhaust gas is thereby absorbed and removed. At this point, the temperature of the exhaust gas drops to several tens of degrees, which is a saturation temperature. This drop in temperature condenses sulfuric acid contained in the exhaust gas into a sulfuric acid mist. The pH of this sulfuric acid mist has a value smaller than 1.

An ammonia gas generated inside the wet type flue gas desulfurization equipment 20 reacts with the sulfuric acid mist to generate ammonium sulfate before being introduced into the wet type electrostatic precipitator 40.

The pH measuring unit 60 is installed in a duct 46 between the wet type flue gas desulfurization equipment 20 and the wet type electrostatic precipitator 40 in the present embodiment. The pH measuring unit 60 is configured to be able to measure the pH value of a sulfuric acid mist in an exhaust gas before being introduced into the wet type electrostatic precipitator 40. The pH measuring unit 60 is configured to be able to send the measured pH value by electrically connecting to the feeding unit 50.

The recovery unit 42 of the wet type electrostatic precipitator 40 forms an ammonium sulfate feeding pipe 44 connected to the wet type flue gas desulfurization equipment 20. The ammonium sulfate feeding pipe 44 is a pipe capable of feeding ammonium sulfate separated from a cleaning fluid by the recovery unit 42 into the oxidation chamber 26 of the wet type flue gas desulfurization equipment 20.

Next, the exhaust gas treatment method of the exhaust gas treatment plant 10 configured as described above will be described below.

An exhaust gas discharged from the boiler 12 is cooled to one hundred and several tens degrees by the first heat exchanger 14 and then introduced into the dry type electrostatic precipitator 16.

Next, the exhaust gas from which dust has been removed by the dry type electrostatic precipitator 16 is introduced into the wet type flue gas desulfurization equipment 20. Inside the wet type flue gas desulfurization equipment 20, an absorbing solution in which the desulfurizing agent is dissolved is sprayed into the exhaust gas from the spray nozzles 24 to absorb and remove sulfur dioxide in the exhaust gas. Also, inorganic ammonium salt is fed from the feeding unit 50 of the inorganic ammonium salt into the oxidation chamber 26 and the desulfurizing agent in a recovered liquid and the inorganic ammonium salt react to give off an ammonia gas. The ammonia gas generated inside the oxidation chamber 26 is mixed into an exhaust gas in the equipment. According to the treatment method of an exhaust gas in the present embodiment, as described above, when an alkali desulfurizing agent is sprayed into an exhaust gas to absorb and remove sulfur oxide in the exhaust gas, an ammonia gas can be mixed into the exhaust gas by feeding inorganic ammonium salt to the desulfurizing agent.

On the other hand, the temperature of the exhaust gas inside the wet type flue gas desulfurization equipment 20 is lowered to several tens of degrees and sulfuric acid contained in the exhaust gas is condensed into a sulfuric acid mist in, the process of lowering the temperature. Ammonium sulfate is generated by a reaction of the sulfuric acid mist with an ammonia gas generated inside the wet type flue gas desulfurization equipment 20.

The pH value measured by the pH measuring unit 60 provided in the duct 46 between the wet type flue gas desulfurization equipment 20 and the wet type electric feeding unit 40 is sent to the feeding unit 50 of inorganic ammonium salt and the feeding unit 50 in the present embodiment controls the amount of feeding of inorganic ammonium salt fed to the wet type flue gas desulfurization equipment 20 based on the measured pH value.

Figure 2:
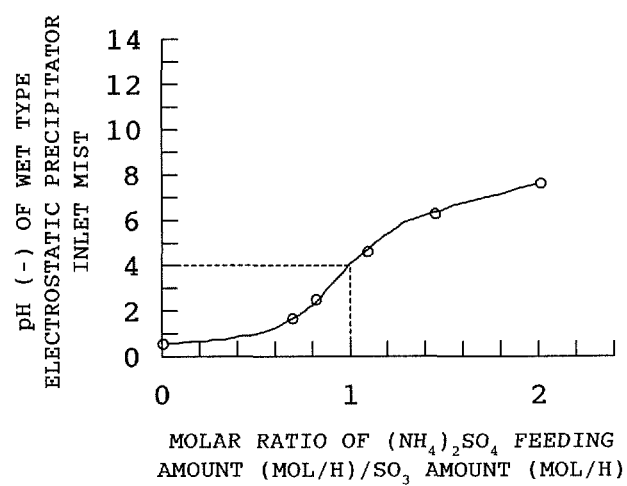
FIG. 2 is a graph showing a relationship between a molar ratio of inorganic ammonium salt (ammonium sulfate) and a sulfuric acid mist and pH.

FIG. 2 is a graph showing a relationship between the molar ratio of inorganic ammonium salt (ammonium sulfate) and $SO_3$ and pH. The vertical axis of the graph denotes the pH value of a sulfuric acid mist on the inlet side of a wet type electrostatic precipitator and the horizontal axis thereof denotes a $(NH_4)_2SO_4$ feeding amount (mol/h)/$SO_3$ amount (mol/h). As shown in the graph, when the molar ratio of ammonium sulfate and $SO_3$ is equimolar, the pH value of a sulfuric acid mist on the inlet side of the wet type electrostatic precipitator is 4. Then, if the feeding amount of ammonium sulfate to $SO_3$ is increased, the pH value of a sulfuric acid mist on the inlet side of the wet type electrostatic precipitator shows a value larger than 4. If the feeding amount of ammonium sulfate to $SO_3$ is decreased, the pH value of a sulfuric acid mist on the inlet side of the wet type electrostatic precipitator shows a value smaller than 4.

Here, stainless steel superior in corrosion resistance is used for the wet type electrostatic precipitator 40 and the main body of the second heat exchanger 18. While there is stainless steel having corrosion resistance even if the pH value is high, the pH value is made to be at least 4 or more in the present embodiment so that SUS304 and SUS316L, which are relatively easily available and versatile, can be made applicable by delaying development of corrosiveness. Because the pH value is 4 or more, the $(NH_4)_2SO_4$ feeding amount (mol/h)/$SO_3$ amount (mol/h) is adjusted so that the feeding amount of ammonium sulfate to $SO_3$ is equimolar or more. From the foregoing, the feeding unit 50 of inorganic ammonium salt may control the feeding amount of inorganic ammonium salt so that the pH value of the pH measuring unit 60 becomes at least 4 or more.

The wet type electrostatic precipitator 40 has the recovery unit 42 of washing water installed therein and the recovery unit 42 separate ammonium sulfate generated by a reaction of an ammonia gas and a sulfuric acid mist from the washing water. The recovery unit 42 is configured so that the washing water separated from ammonium sulfate is reused as the washing water. On the other hand, ammonium sulfate is fed from the ammonium sulfate feeding pipe 44 of the recovery unit 42 to the wet type flue gas desulfurization equipment 20. By feeding ammonium sulfate collected by the wet type electrostatic precipitator 40 to the wet type flue gas desulfurization equipment 20 again in this manner, the amount of inorganic ammonium salt to be newly fed can be reduced.

According to the treatment method and plant of an exhaust gas of the present invention described above, an ammonia gas is generated in wet type flue gas desulfurization equipment, thereby allowing the ammonia gas and a sulfuric acid mist to stay longer to react sufficiently up to a wet type electrostatic precipitator subsequent thereto.

Also, by measuring a pH value of a sulfuric acid mist after wet type desulfurization and feeding inorganic ammonium salt to the desulfurizing agent in the desulfurization step based on the pH value, corrosion resistance of the plant subsequent to the wet type flue gas desulfurization equipment is improved so that an exhaust gas containing sulfur oxide can be treated for a long term with stability by increasing the longevity of the plant.

The present invention can adopt the following mode. A treatment method of an exhaust gas in the present invention for removing sulfur oxide by wet type desulfurization of the exhaust gas using an alkali desulfurizing agent and removing a sulfuric acid mist by feeding ammonia into the exhaust gas is characterized in that an ammonia gas is mixed into the exhaust gas by feeding inorganic ammonium salt to an alkali desulfurizing agent when the desulfurizing agent is sprayed into the exhaust gas to absorb and remove the sulfur oxide in the exhaust gas.

With the above configuration, an ammonia gas can be generated by feeding inorganic ammonium salt to allow the inorganic ammonium salt to react with an alkali desulfurizing agent in the wet type desulfurization step using the desulfurizing agent. By generating an ammonia gas in the flue gas desulfurization equipment, the ammonia gas and a sulfuric acid mist are allowed to stay longer to react sufficiently up to the wet type electrostatic precipitator subsequent thereto.

Also, a treatment method of an exhaust gas in the present invention for removing sulfur oxide by wet type desulfurization of the exhaust gas and removing a sulfuric acid mist by feeding ammonia into the exhaust gas includes a desulfurization step of absorbing and removing the sulfur oxide in the exhaust gas by spraying an alkali desulfurizing agent into the exhaust gas, a step of measuring a pH value of the exhaust gas after wet type desulfurization, and a step of mixing an ammonia gas into the exhaust gas by controlling a feeding amount of inorganic ammonium salt to the desulfurizing agent in the desulfurization step based on the pH value.

With the above configuration, corrosion resistance of the plant subsequent to the wet type desulfurization step is improved so that an exhaust gas containing sulfur oxide can be treated for a long term with stability by increasing the longevity of the plant.

In this case, the inorganic ammonium salt may be fed so that the pH value becomes at least 4 or more.

Corrosion resistance of the plant is improved by the above method so that an exhaust gas containing sulfur oxide can be treated for a long term with stability by increasing the longevity of the plant. Also, the used amount of inorganic ammonium salt can be optimized.

The inorganic ammonium salt may be one of $NH_4Cl$, $NH_4NO_3$, $(NH_4)_2CO_3$, and $(NH_4)_2SO_4$ According to the above method, the inorganic ammonium salt is a neutral compound and thus, is easier to handle than an ammonia gas, which makes it easier to mix the ammonia gas into an exhaust gas containing a sulfuric acid mist.

An exhaust gas treatment plant according to the present invention that removes sulfur oxide by wet type desulfurization of the exhaust gas and removes a sulfuric acid mist by feeding ammonia into the exhaust gas includes a feeding unit of inorganic ammonium salt that generates an ammonia gas by being allowed to react with an alkali desulfurizing agent inside wet type flue gas desulfurization equipment in the wet type flue gas desulfurization equipment that absorbs and removes sulfur oxide in the exhaust gas by spraying the desulfurizing agent into the exhaust gas.

With the above configuration, an ammonia gas can be generated by feeding inorganic ammonium salt to allow the inorganic ammonium salt to react with an alkali desulfurizing agent in the wet type flue gas desulfurization equipment using the alkali desulfurizing agent. By generating an ammonia gas in the wet type flue gas desulfurization equipment, the ammonia gas and a sulfuric acid mist are allowed to stay longer to react sufficiently up to the wet type electrostatic precipitator subsequent thereto.

An exhaust gas treatment plant according to the present invention that removes sulfur oxide by wet type desulfurization of the exhaust gas and removes a sulfuric acid mist by feeding ammonia into the exhaust gas includes wet type flue gas desulfurization equipment that absorbs and removes sulfur oxide in the exhaust gas by spraying an alkali desulfurizing agent into the exhaust gas, a wet type electrostatic precipitator that removes the sulfuric acid mist allowed to react with the ammonia, a pH measuring unit that measures a pH value of the sulfuric acid mist at an inlet of the wet type electrostatic precipitator after wet type desulfurization, and a feeding unit that controls a feeding amount of inorganic ammonium salt that generates an ammonia gas by being allowed to react with the desulfurizing agent in the wet type flue gas desulfurization equipment based on the pH value.

With the above configuration, corrosion resistance of the plant subsequent to the wet type flue gas desulfurization equipment is improved so that an exhaust gas containing sulfur oxide can be treated for a long term with stability by increasing the longevity of the plant.

In this case, a recovery unit capable of feeding a collected liquid containing the inorganic ammonium salt discharged from the wet type electrostatic precipitator to the wet type flue gas desulfurization equipment may be included.

A collected liquid of the wet type electrostatic precipitator contains ammonium sulfate generated by a reaction of $NH_3$ and $SO_3$ and thus, by feeding the collected liquid to the wet type flue gas desulfurization equipment by adopting the above configuration, the amount of inorganic ammonium salt to be newly fed can be reduced.

The inorganic ammonium salt may be one of $NH_4Cl$, $NH_4NO_3$, $(NH_4)_2CO_3$, and $(NH_4)_2SO_4$.

According to the above method, the inorganic ammonium salt is a neutral compound and thus, is easier to handle than an ammonia gas, which makes it easier to mix the ammonia gas into an exhaust gas containing a sulfuric acid mist. According to the present invention based on the above method or configuration, an ammonia gas can be generated in wet type flue gas desulfurization equipment by feeding inorganic ammonium salt to the equipment. By generating an ammonia gas in the wet type flue gas desulfurization equipment, the ammonia gas and a sulfuric acid mist are allowed to stay longer to react sufficiently up to the wet type electrostatic precipitator subsequent thereto.

By measuring a pH value of an exhaust gas after wet type desulfurization and feeding inorganic ammonium salt to the desulfurizing agent in the desulfurization step based on the pH value, corrosion resistance of the plant subsequent to the wet type flue gas desulfurization equipment is improved so that an exhaust gas containing sulfur oxide can be treated for a long term with stability by increasing the longevity of the plant.

The inorganic ammonium salt can be fed to the wet type flue gas desulfurization equipment in a liquid or solid state, which makes handling easier compared with a conventional method of feeding an ammonia gas (gaseous state) into the plant.

The invention claimed is:

1. An exhaust gas treatment plant that removes sulfur oxide by wet type desulfurization of the exhaust gas and removes a sulfuric acid mist by feeding ammonia into the exhaust gas, comprising:
   a wet type flue gas desulfurization equipment; and
   a feeding unit containing inorganic ammonium salt, the feeding unit connected to the wet type flue gas desulfurization equipment, the feeding unit being capable of feeding the inorganic ammonium salt into the wet type flue gas desulfurization equipment, wherein the inorganic ammonium salt fed from the feeding unit generates an ammonia gas by being allowed to react with an alkali desulfurizing agent sprayed into the exhaust gas, the reaction taking place inside the wet type flue gas desulfurization equipment, the sprayed desulfurizing agent absorbing and removing sulfur oxide in the exhaust gas;
   a wet type electrostatic precipitator that removes the sulfuric acid mist allowed to react with the ammonia gas; and
   a recovery unit collecting washing liquid from the electrostatic precipitator, the recovery unit being configured to separate inorganic ammonium salt from the washing liquid and feed the separated inorganic ammonium salt discharged from the wet type electrostatic precipitator to the wet type flue gas desulfurization equipment.

2. The exhaust gas treatment plant according to claim 1, further comprising a pH measuring unit that measures a pH value of the sulfuric acid mist at an inlet of the wet type electrostatic precipitator after wet type desulfurization, wherein the feeding unit controls the feeding amount of inorganic ammonium salt that generates an ammonia gas by being allowed to react with the desulfurizing agent in the wet type flue gas desulfurization equipment based on the pH value.

3. The exhaust gas treatment plant according to claim 1, wherein the inorganic ammonium salt is one of $NH_4Cl$, $NH_4NO_3$, $(NH_4)_2CO_3$, and $(NH_4)_2SO_4$.

4. The exhaust gas treatment plant according to claim 1, further comprising:

a spray nozzle for the alkali desulfurization agent, the spray nozzle configured to generate a spray of the alkali desulfurizing agent, the spray nozzle positioned to be capable of spraying the alkali desulfurizing agent into the exhaust gas within the wet type flue gas desulfurization equipment; and an oxidation chamber formed in the lower part of a desulfurization tower main body of the wet type flue gas desulfurization equipment, the oxidation chamber positioned to receive the inorganic ammonium salt fed into the wet type flue gas desulfurization equipment from the feeding unit after the inorganic ammonium salt is fed into the alkali desulfurization agent sprayed into the exhaust gas, wherein the feeding unit of inorganic ammonium salt is positioned to feed the inorganic ammonium salt into the spray of the alkali desulfurizing agent generated by the spray nozzle.

5. The exhaust gas treatment plant according to claim 2, wherein the recovery unit is further configured to return the washing water from which ammonium salt has been separated to the wet type electrostatic precipitator.

6. The exhaust gas treatment plant according to claim 1, wherein the recovery unit is further configured to return the collected liquid from which ammonium salt has been separated to the wet type electrostatic precipitator.

7. The exhaust gas treatment plant according to claim 5, further comprising:

a spray nozzle for the alkali desulfurization agent, the spray nozzle configured to generate a spray of the alkali desulfurizing agent, the spray nozzle positioned to be capable of spraying the alkali desulfurizing agent into the exhaust gas within the wet type flue gas desulfurization equipment, wherein the recovery unit is further configured to feed the separated inorganic ammonium salt discharged from the wet type electrostatic precipitator into the spray of the alkali desulfurizing agent generated by the spray nozzle.

8. The exhaust gas treatment plant according to claim 6, further comprising:

a spray nozzle for the alkali desulfurization agent, the spray nozzle configured to generate a spray of the alkali desulfurizing agent, the spray nozzle positioned to be capable of spraying the alkali desulfurizing agent into the exhaust gas within the wet type flue gas desulfurization equipment, wherein the recovery unit is further configured to feed the separated inorganic ammonium salt discharged from the wet type electrostatic precipitator into the spray of the alkali desulfurizing agent generated by the spray nozzle.

* * * * *